United States Patent [19]
Ringer

[11] Patent Number: 5,873,574
[45] Date of Patent: *Feb. 23, 1999

[54] BELLOWS SEAL WITH REVERSE PRESSURE CAPABILITY

[75] Inventor: Yoram Ringer, Cranston, R.I.

[73] Assignee: John Crane Sealol Inc., Cranston, R.I.

[ * ] Notice: This patent issued on a continued prosecution application filed under 37 CFR 1.53(d), and is subject to the twenty year patent term provisions of 35 U.S.C. 154(a)(2).

[21] Appl. No.: 683,733

[22] Filed: Jul. 18, 1996

[51] Int. Cl.$^6$ ........................................... F16J 15/34
[52] U.S. Cl. ........................... 277/389; 277/348; 277/389; 277/929
[58] Field of Search ................................ 277/65, 88, 361, 277/348, 352, 387, 389, 926, 929

[56] References Cited

U.S. PATENT DOCUMENTS

| | | | |
|---|---|---|---|
| 3,313,580 | 4/1967 | Jelatis et al. . | |
| 3,511,510 | 5/1970 | Lindeboom . | |
| 4,123,069 | 10/1978 | Sato | 277/88 |
| 4,290,611 | 9/1981 | Sedy | 277/27 |
| 4,434,986 | 3/1984 | Warner | 277/65 |
| 4,560,173 | 12/1985 | Adams et al. | 277/88 |
| 4,889,348 | 12/1989 | Amundson et al. | 277/65 |
| 4,889,350 | 12/1989 | Tranter | 277/88 |
| 5,213,340 | 5/1993 | Azibert et al. | 277/65 |
| 5,375,853 | 12/1994 | Wasser et al. | 277/59 |
| 5,454,572 | 10/1995 | Pospisil | 277/65 |
| 5,490,679 | 2/1996 | Borrino et al. | 277/65 |
| 5,490,682 | 2/1996 | Radosav et al. | 277/82 |

FOREIGN PATENT DOCUMENTS

| | | |
|---|---|---|
| 35 34 452 | 4/1987 | Germany . |
| 59-190578 | 10/1984 | Japan . |

OTHER PUBLICATIONS

Sales Brochure for "Type 2800 for Non–Contacting, Dry Running Double Cartridge Seal", John Crane Inc. 6 pages, nominal publication date 1993.

Sales Brochure for "Type 1215 and 2215 Metal Bellows Cartridge Seals," John Crane Inc., 1991.

EG&G Sealol, Inc.—Redacted page from Distributor's Release Illustrating Type 631 Welded Metal Bellows Cartridge Seal (undated).

EG&G Sealol, Inc. Industrial Division—Drawing No. 0704519 R/S (Rev.A)—Nominal date Jun. 28, 1991, Date of publication or First Use sometime in 1991–92.

Sales Brochure for "5615 and 5625 Universal Cartridge Metal Bellows Seal" John Crane Inc. Sep. 1996 (Nominal Publication Date).

*Primary Examiner*—Daniel G. DuPumpo
*Attorney, Agent, or Firm*—Dorn, McEachran, Jambor & Keating

[57] ABSTRACT

A seal for sealing a low pressure area from a high pressure area for containing a process fluid. The high pressure area is located along a rotatable shaft extending from a machine body. The seal includes an outboard seal positioned along the shaft, and an inboard seal axially spaced along the shaft from the outboard seal. An annular chamber is defined between the inboard seal and the outboard seal for containing a buffer fluid. The inboard seal includes a stationary assembly attached to the machine body. The stationary assembly includes a stationary seal ring having a stationary sealing face, and a first secondary seal between the stationary seal ring and the housing. The inboard seal further includes a rotating assembly attached to the shaft. The rotating assembly includes a rotating seal ring having a rotating sealing face in sealing relation with the stationary sealing face and a second secondary seal between the rotating seal ring and the shaft. The first and second secondary seals define fluid pressure barriers for causing axial movement of at least a portion of the stationary assembly and maintaining the sealing relation of the rotating and stationary sealing faces when the pressure of the buffer fluid is less than the pressure of the process fluid.

18 Claims, 5 Drawing Sheets

BELLOWS SEAL WITH REVERSE PRESSURE CAPABILITY

BACKGROUND OF THE INVENTION

1. Field of the Invention

The present invention relates to a seal, and more specifically to a bellows gas seal capable of undergoing a reverse pressure change.

2. Discussion of the Related Art

Pumps, especially those in refineries and chemical plants, often handle difficult-to-seal liquids, including propane, butane, and other unstable, combustible, or toxic liquids. These liquids can cause short seal life and undesirable product leakage, prompting the passage of state health and safety pump emission regulations.

Dry-running gas lubricated seals have been developed and provide significant economic benefits over contact seals. One of the first working examples of a gas type seal was disclosed in U.S. Pat. No. 3,499,653 to Gardner. In that seal, the relatively rotatable sealing members are kept from touching one another during operation, reducing wear and heat due to friction. A gas pressure is created between the seal member faces to separate the faces by forming a thin film of gas between them. Shallow spiral grooves on the outer periphery of one of the seal members cause gas to be forced inward, thus providing sufficient pressure to separate the seal member faces. This type of seal is called a "non-contacting" seal because the sealing faces separate and a thin film of gas forms therebetween during operation. An O-ring is used as a secondary seal, and springs provide a biasing force against the opening of the seal faces and close the gap between the faces when the equipment is not operating.

More recently, gas seals have incorporated bellows as a secondary seal and biasing member. Often, a buffer gas is supplied to a seal at a pressure higher than the process fluid to help prevent leakage of process fluid across the non-contacting sealing faces. Should a sudden drop of buffer gas pressure occur so that the pressure of the process fluid exceeds that of the buffer gas (a so called "pressure reversal"), a non-contacting bellows gas seal may blow open, resulting in high leakage of process fluid into the atmosphere.

SUMMARY OF THE INVENTION

An object of the invention, therefore, is to provide an improved non-contacting bellows gas seal capable of maintaining a sealing relationship between the seal faces upon the occurrence of a pressure reversal. Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, the invention comprises a seal for sealing a low pressure area from a high pressure area for containing a process fluid. The high pressure area is located along a rotatable shaft extending from a machine body. The seal includes an outboard seal positioned along the shaft, and an inboard seal spaced axially along the shaft from the outboard seal. An annular chamber is defined between the inboard seal and the outboard seal for containing a buffer fluid. The inboard seal includes a stationary assembly attached to the machine body. The stationary assembly includes a stationary seal ring having a stationary sealing face, and a first secondary seal between the stationary seal ring and the housing. The inboard seal further includes a rotating assembly attached to the shaft. The rotating assembly includes a rotating seal ring having a rotating sealing face in sealing relation with the stationary sealing face and a second secondary seal between the rotating seal ring and the shaft. The first and second secondary seals define fluid pressure barriers for causing axial movement of at least a portion of the stationary assembly and maintaining the sealing relation of the rotating and stationary sealing faces when the pressure of the buffer fluid is less than the pressure of the process fluid.

According to another aspect, the invention comprises a gas seal including a stationary assembly attached to a machine body. The stationary assembly includes a stationary seal ring having a stationary sealing face, and a first secondary seal between the machine body and the stationary seal ring. A rotary assembly attaches to a rotatable shaft extending from the machine body and includes a rotating seal ring having a rotating sealing face in sealing relation with the stationary sealing face, and a second secondary seal between the rotating seal ring and the rotatable shaft. A sealing diameter of the first secondary seal differs from a sealing diameter of the second secondary seal to define fluid pressure barriers so that fluid pressure forces cause axial movement of at least a portion of the stationary assembly depending on a pressure differential of a process fluid to be sealed and a buffer fluid supplied to the gas seal.

According to a further aspect, the invention comprises a seal for sealing a process fluid. The seal includes a stationary seal ring coupled to a machine body. The stationary seal ring has a stationary sealing face. A rotating seal ring couples to a rotatable shaft extending from the machine body. The rotating seal ring has a rotating sealing face in sealing relation with the stationary sealing face. The seal further includes means for defining fluid pressure barriers so that fluid pressure forces cause axial movement of a portion of the seal and the stationary and rotating sealing faces remain in sealing relation when the pressure of the process fluid is greater than the pressure of a buffer fluid supplied to the seal.

It is to be understood that the foregoing general description and the following detailed description are exemplary and explanatory only and are not restrictive of the invention as claimed.

BRIEF DESCRIPTION OF THE DRAWINGS

The accompanying drawings are included to provide a further understanding of the invention and are incorporated in and constitute part of the specification, illustrate preferred embodiments of the invention, and, together with a description, serve to explain the principles of the invention.

DETAILED DESCRIPTION OF THE PREFERRED EMBODIMENTS

Reference will be made in detail to the present preferred embodiments of the invention, examples of which are illustrated in the accompanying drawings. Like reference numerals refer to like parts in the various figures of the drawings.

The present invention is directed to a gas seal having an inboard non-contacting bellows seal capable of maintaining a sealing relationship between the sealing faces upon the occurrence of a reverse pressure change. The general purpose of such a seal is to seal rotating equipment from leaking an internal process fluid or gas to the atmosphere. The seal is suitable for use in pumps, centrifugal gas compressors, gas or steam turbines, gas expanders, or other industrial applications, and also aerospace applications, including jet engines, turbo compressors, and cryogenics.

The gas seal according to the present invention incorporates an inboard seal and an outboard seal axially separated along a rotating shaft of the equipment to define a chamber therebetween. During normal operation, the chamber accepts a buffer fluid at a pressure exceeding that of the process fluid to separate the sealing faces of the stationary and rotating seal rings of both the inboard and outboard seals.

The non-contacting sealing face of the inboard seal is designed with a high hydrostatic balance (approximately 75%) and a relatively wide annular cross-sectional face. (Hydrostatic balance is the ratio of the annular area of the sealing face from its outer diameter to a bellows mean diameter to the annular area of the seal face from the bellows mean diameter to the seal face inner diameter.) Should a sudden loss of buffer gas pressure occur so that the process fluid pressure exceeds the buffer gas pressure, such a design would cause the sealing faces of the inboard seal to open, in the absence of other preventative structure. A large opening of the seal faces would result in leakage of process fluid into the atmosphere.

In light of this seal face design, the seal according to the present invention includes structure to maintain the sealing relationship between the seal rings of the inboard seal from opening should a pressure reversal occur. More particularly, the seal includes structure defining fluid pressure boundaries for causing axial movement of at least a portion of the seal to maintain the sealing relationship when the process fluid pressure exceeds the buffer fluid pressure. In each of two embodiments to be described, the seal includes secondary seals, the sealing diameters of which define these fluid pressure boundaries. According to a first embodiment, the secondary seals define the boundaries so that fluid pressure forces cause the seal rings to move axially until a contact force from a gland attached to the housing causes the sealing faces to close. According to a second embodiment, the seal rings remain in place and a seal ring shell moves axially away from the seal rings. High pressure process fluid acting on the back face of the stationary seal ring maintains the seal rings in sealing relation. In both cases, an inboard bellows secondary seal compresses, increasing a mechanical spring force provided by the bellows. These two embodiments will be described in detail.

Figure 1:
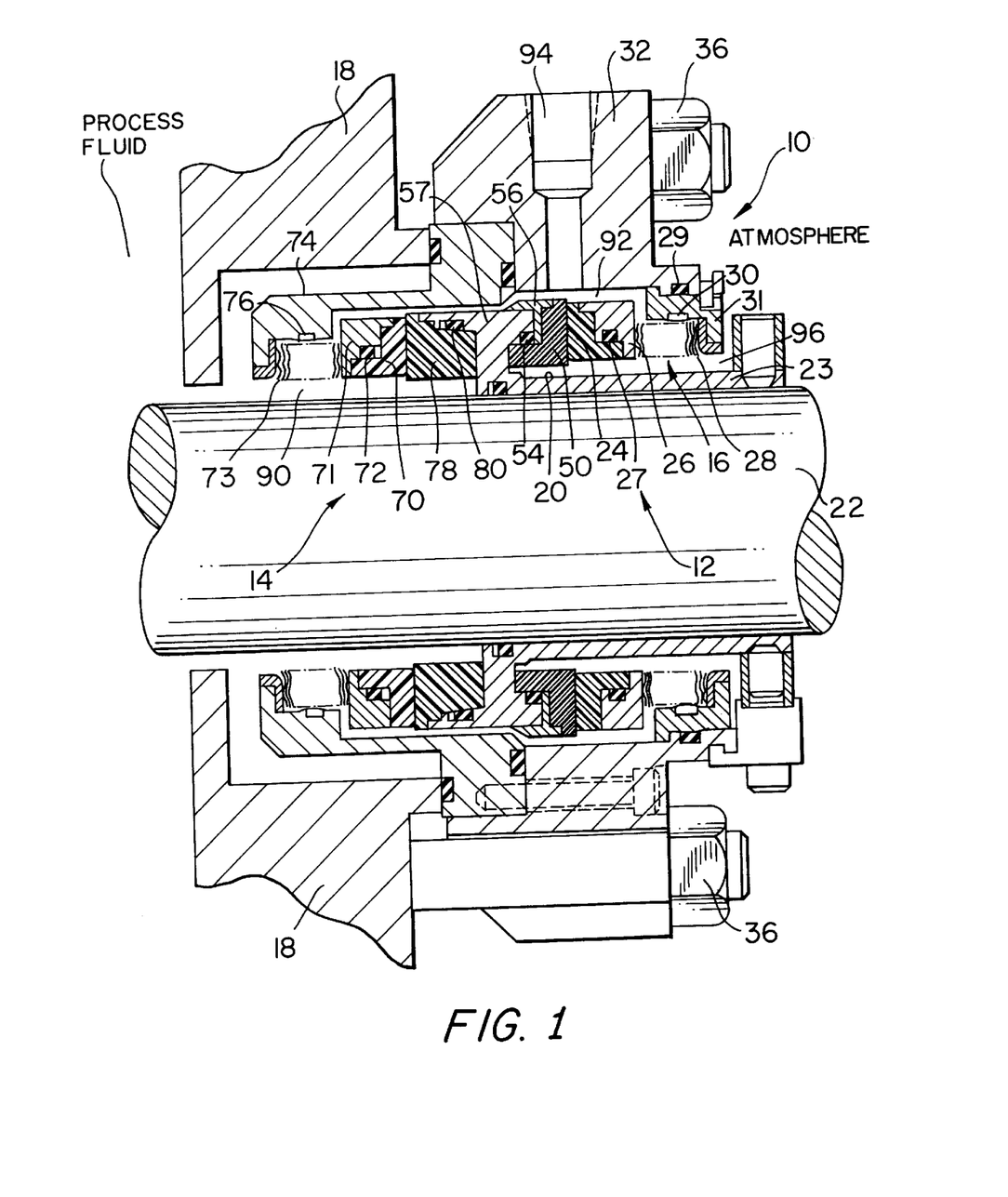
FIG. 1 is a cross-sectional view of a first embodiment of a non-contacting bellows seal according to the present invention.

The first embodiment of a seal according to the present invention is shown in FIG. 1 and denoted generally by reference numeral 10. Seal 10 includes an outboard non-contacting gas seal 12 and an inboard non-contacting gas seal 14. The non-contacting seal 12 consists of a stationary assembly 16 attached to a machine body 18 and a rotary assembly 20 attached to a rotary shaft 22 mounted within a sleeve 23.

Stationary assembly 16 includes a stationary seal ring 24, a seal ring shell 26, O-ring secondary seals 27 and 29, a bellows 28, a damper strip 30, an adaptive end fitting 31, and an adaptive housing 32. All of these components are annular.

Stationary seal ring 24 is preferably made of chemical grade carbon and includes a stator sealing face facing the inboard side. O-rings 27 and 29 preferably consist of synthetic rubber and provide a secondary seal. Adaptive housing 32 is designed as required for proper installation onto particular equipment. Preferably, a plurality of socket head cap screws 36, or other suitable means such as hex nuts, are used to attach housing 32 to machine body 18.

Bellows 28 is a flexible member preferably welded to ring shell 26. Bellows 28 acts as both a flexible member and a dynamic secondary seal. Bellows 28 flexes to accommodate axial motion and runout. (Runout is the angular misalignment of the rotating seal ring with respect to the shaft axis.) Bellows 28 preferably consists of individual thin tin plates, each approximately 0.12–0.20 millimeters in thickness, with male and female fittings for proper nesting within one another. During operation, bellows 28 is prone to vibration. To prevent fatigue failure of bellows 28, damper strip 30 provides frictional damping. The ring-shaped damper strip 30 preferably consists of metal.

Rotary assembly 20 of seal 12 includes a rotating seal ring 50, an O-ring secondary seal 54, and a rotor adapter 56 seated within a flange portion 57 of sleeve 23. All of these components are annular. As with O-rings 27 and 29, O-ring 54 preferably consists of synthetic rubber and provides a secondary seal.

Figure 7:
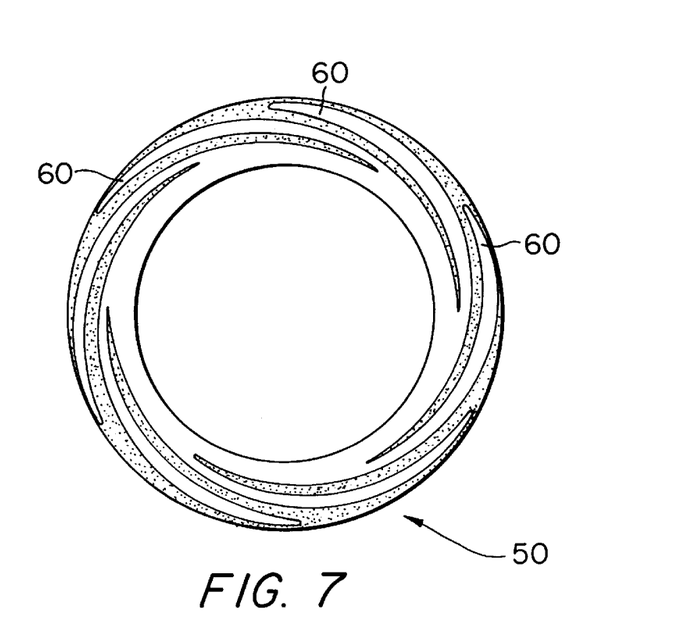
FIG. 7 is a plan view of a rotor sealing face used in a non-contacting bellows seal according to the present invention.

Rotating seal ring 50 preferably consists of sintered silicon carbide, or other suitable materials known in the art, chosen for its short lead time (i.e., time required to develop the rotor for use), low cost, and high strength to weight ratio. Rotating seal ring 50 has a sealing face opposing the sealing face of stationary seal ring 24. The rotating seal ring face includes spiral grooves 60 formed thereon, as shown in FIG. 7. Grooves 60 are preferably shallow, only approximately 0.06–0.07 mm (0.0002–0.0003 inches) deep. The groove design, however, can be altered for a particular application. In addition, the grooves can be incorporated in the stationary seal ring face instead of the rotating seal ring face.

Grooves 60 provide both hydrostatic (i.e., non-rotating) and hydrodynamic (rotating) forces for separating the stator and rotor sealing faces. When rotating seal ring 50 is exposed to a pressurized gas, the gas enters the grooves 60 and provides an opening force. Typical separation between the seal faces under dynamic conditions is of the order of 50–200μ pinches.

The inboard seal 14 is also a non-contacting seal consisting of a stationary assembly and a rotary assembly having similar components as outboard seal 12. The stationary assembly includes a stationary seal ring 70, a seal ring shell 71, an O-ring secondary seal 72, and a bellows 73. Bellows 73 attaches to a gland 74 which connects to housing 18. A damper strip 76 provides frictional damping of bellows 73.

The rotating assembly of inboard seal 14 includes a rotating seal ring 78 and an O-ring secondary seal 80 between seal ring 78 and the flange portion 57 of sleeve 23. As shown in FIG. 1, the effective sealing diameter of O-ring 80 is larger than that of the bellows 73. As will be described, this effects the operation of the seal should a pressure reversal occur.

Seal ring 78 has a sealing face opposing a sealing face of stationary seal ring 70. The face of rotating seal ring 78 includes spiral grooves for separating the sealing faces. In the alternative, as in the outboard seal, the face of stationary seal ring 70 may incorporate the spiral grooves.

Machine body 18, seal 10, and rotary sleeve 23 define three annular chambers. During operation, a first chamber 90 contains process fluid, while a second chamber 92 contains buffer fluid supplied from a port 94 of the adaptive housing 32. Preferably, the buffer fluid is a gas, most preferably an inert gas such as nitrogen. A third annular chamber 96 is open to the atmosphere and is defined by sleeve 23 and seal 12.

Initially, prior to operation, the sealing faces of both the inboard and outboard seals are contacting due to the mechanical spring force supplied by bellows 73 and 28 respectively. The spring force produces a low static face pressure to promote quick lift-off and minimizes wear should face contact occur at start-up and shut-down of rotation.

During operation and rotation of shaft 22, a buffer gas, preferably nitrogen or air, is supplied through port 94 to chamber 92. Under normal operation, the buffer gas is supplied at a pressure above atmospheric pressure and, preferably, at a pressure slightly higher than that of the process fluid to ensure no leakage of process fluid into chamber 92.

As shaft 22 rotates and spins rotating seal rings 50 and 78, and as gas pressure is applied to the chamber 92, gas flows into the grooves of rotating seal rings 50 and 78 and is pumped inward creating a high opening pressure. At both the inboard and outboard seals, the stator and rotor sealing faces separate and a thin film of gas forms therebetween. Thus, contact between the sealing faces and the generation of undesirable friction and heat are prevented during operation. Minimizing friction generated heat eliminates conditions leading to seal failure. Contact stress and wearing of seal faces is minimized. In addition, any thermal distortion of the sealing faces, which would otherwise cause them to improperly contact, will not affect seal life in a non-contacting seal.

Figure 2:
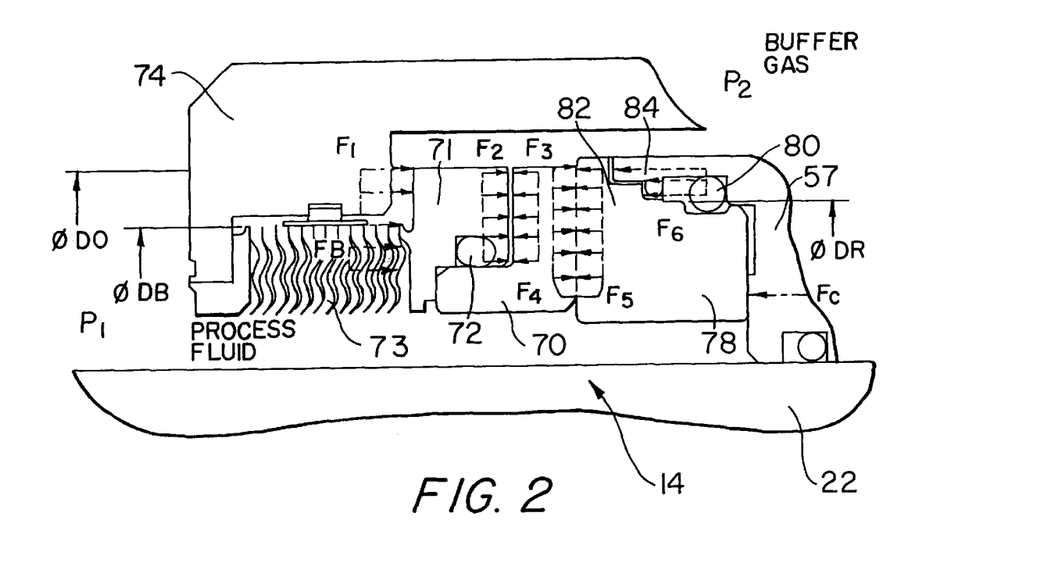
FIG. 2 is a cross-sectional free-body force diagram of the inboard seal of the FIG. 1 seal, showing the forces during normal operation.

FIG. 2 illustrates the forces acting on the inboard seal 14 during normal operating conditions, i.e. the buffer gas pressure $P_2$ exceeds the process fluid pressure $P_1$. FIG. 2 and the other free-body force diagrams discussed herein show only the absolute forces acting on the seal that result from the difference in pressure between the buffer gas and the process fluid. Only these absolute forces will be described.

Under normal operating conditions, bellows 73 supplies a force $FB_o$ acting in the outboard direction to oppose the opening of the sealing faces of the stationary and rotating seal rings 70 and 78. The bellows force $FB_o$ consists of two components: one resulting from the mechanical bellows spring force and another resulting from the hydraulic pressure forces. The hydraulic pressure force component acts at the effective balance diameter (EBD) of the bellows. The EBD varies as a function of the pressure differential ($P_2-P_1$) between the buffer gas and process fluid. When the process fluid and the buffer gas are at the same pressure, the EBD is approximately located at the bellows means diameter. When the buffer gas pressure exceeds the process fluid pressure, the EBD shifts radially inward. The hydraulic force component of $FB_o$, therefore, also varies as a function of this pressure differential.

The buffer gas supplies a force $F_1$ acting on the back face of seal ring shell 71 down to the outer diameter DB of bellows 73. $F_1$ acts in the outboard direction. The buffer gas also supplies equal and opposite forces $F_2$ and $F_3$ acting on the opposing faces of seal ring shell 71 and stationary seal ring 70. $F_2$ and $F_3$ act on these faces down to the inner sealing diameter of O-ring 72 and cancel each other out.

As mentioned, the spiral grooves of rotating seal ring 78 pump buffer gas inward, creating a high opening pressure between the sealing faces of the stationary and rotating seal rings 70 and 78. The forces created by this pressure are represented in FIG. 2 as equal and opposite forces $F_4$ and $F_5$. These forces also cancel each other out.

The buffer gas further provides a force $F_6$ acting on the back face of rotating seal ring 78 down to the inner sealing diameter of O-ring 80. A contact force $F_c$ caused by the contact between rotating seal ring 78 and the flange portion 57 of sleeve 23 also acts on the back face of seal ring 78. $F_6$ and $F_c$ act in an inboard direction.

The net of these forces must equal zero:

$$FB_o + F_1 + F_2 - F_3 + F_4 - F_5 - F_6 - F_c = 0 \qquad \text{(eq. 1)}$$

Canceling $F_2$, $F_3$, $F_4$, and $F_5$ results in:

$$F_c = FB_o + F_1 - F_6. \qquad \text{(eq. 2)}$$

$$\text{As } F_1 = (P_2 - P_1) \times \frac{\pi}{4} (DO^2 - DB^2), \qquad \text{(eq. 3)}$$

and $$F_6 = (P_2 - P_1) \times \frac{\pi}{4} (DO^2 - DR^2), \qquad \text{(eq. 4)}$$

then $$F_c = FB_o + \frac{\pi}{4} (P_2 - P_1)(DR^2 - DB^2). \qquad \text{(eq. 5)}$$

Because $FB_o > 0$, $P_2 - P_1 > 0$, and the inner diameter of O-ring 80 is larger than the outer diameter of bellows 73 (i.e., DR>DB), Under normal operating conditions, therefore, the contact force $F_c$ is greater than zero and rotating seal ring 78 will remain in place, seated against flange portion 57 of sleeve 23. Under such conditions and as shown in FIG. 2, a stepped portion 82 of rotating seal ring 78 mates with a corresponding stepped stop portion 84 of flange 57.

Should the seal 10 experience a sudden loss of buffer gas pressure so that the process fluid pressure exceeds the buffer gas pressure, high process fluid pressure acting on the back face of rotating seal ring 78 will force seal ring 78 toward the inboard direction. Rotating seal ring 78, along with stationary seal ring 70 and seal ring shell 71, will continue to move to the left until ring shell 71 contacts gland 74. At that point, a contact force from gland 74, an increased mechanical spring force of bellows 73, and high process fluid pressure forces acting on the back face of rotating seal ring 78 will force the seal rings to close, preventing leakage of process fluid into chamber 92.

Figure 3:
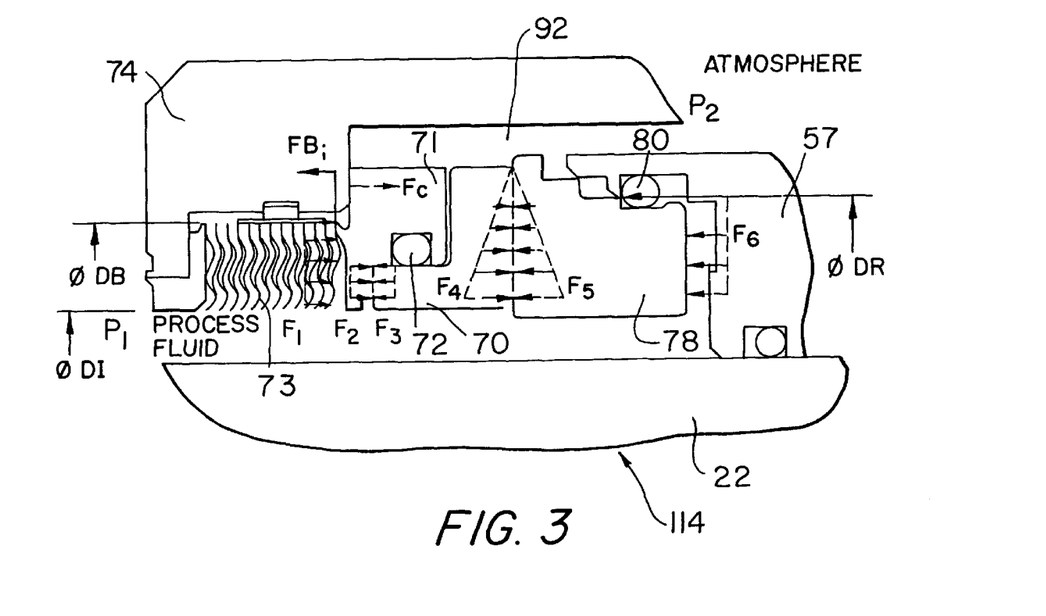
FIG. 3 is a cross-sectional free-body force diagram of the inboard seal of the FIG. 1 seal, showing the forces during reverse pressure conditions.

FIG. 3 shows the forces acting on inboard seal 14 under this reverse pressure situation. A force $FB_i$ provided by bellows 73 acts in a direction opposite to $FB_o$ and compresses bellows 73. The direction of $FB_i$ has been confirmed through testing. The process fluid applies a force $F_1$ at the back face of seal ring shell 71 up to the outer bellows diameter DB. As mentioned, gland 74 applies a contact force $F_c$ at the back face of seal ring shell 71. $F_1$ and $F_c$ act in the outboard direction.

Process fluid pressure also acts on opposing faces of ring shell 71 and stationary seal ring 70 up to the inner diameter of O-ring 72. The resultant forces $F_2$ and $F_3$ are equal and opposite to cancel out. $F_4$ and $F_5$ are caused by process fluid between the seal faces and also oppose each other to cancel out. Process fluid also applies a force $F_6$ on the back face of rotating seal ring 78 up to the sealing diameter DR of O-ring 80. $F_6$ acts in the inboard direction.

The net of these forces must equal zero:

$$FB_i - F_1 - F_c - F_2 + F_3 - F_4 + F_5 + F_6 = 0 \quad \text{(eq. 6)}$$

Canceling $F_2$, $F_3$, $F_4$, and $F_5$ results in:

$$F_c = FB_i + F_1 + F_6. \quad \text{(eq. 7)}$$

Since $F_1 = (P_1 - P_2) \times \frac{\pi}{4}(DB^2 - DI^2)$, (eq. 8)

and $$F_6 = (P_1 - P_2) \times \frac{\pi}{4}(DR^2 - DI^2), \quad \text{(eq. 9)}$$

then $$F_c = FB_i + \frac{\pi}{4}(P_1 - P_2)(DR^2 - DB^2). \quad \text{(eq. 10)}$$

Because $FB_i > 0$, $DR - DB > 0$, and $P_1 - P_2 > 0$, $F_c > 0$. Under reverse pressure conditions, therefore, the contact force $F_c$ between gland 74 and ring shell 71 is greater than zero. The rotating seal ring 78, stationary seal ring 70, and seal ring shell 71, as described earlier, will move in the inboard direction until ring shell 71 contacts gland 74, closing the sealing faces.

Figure 4:
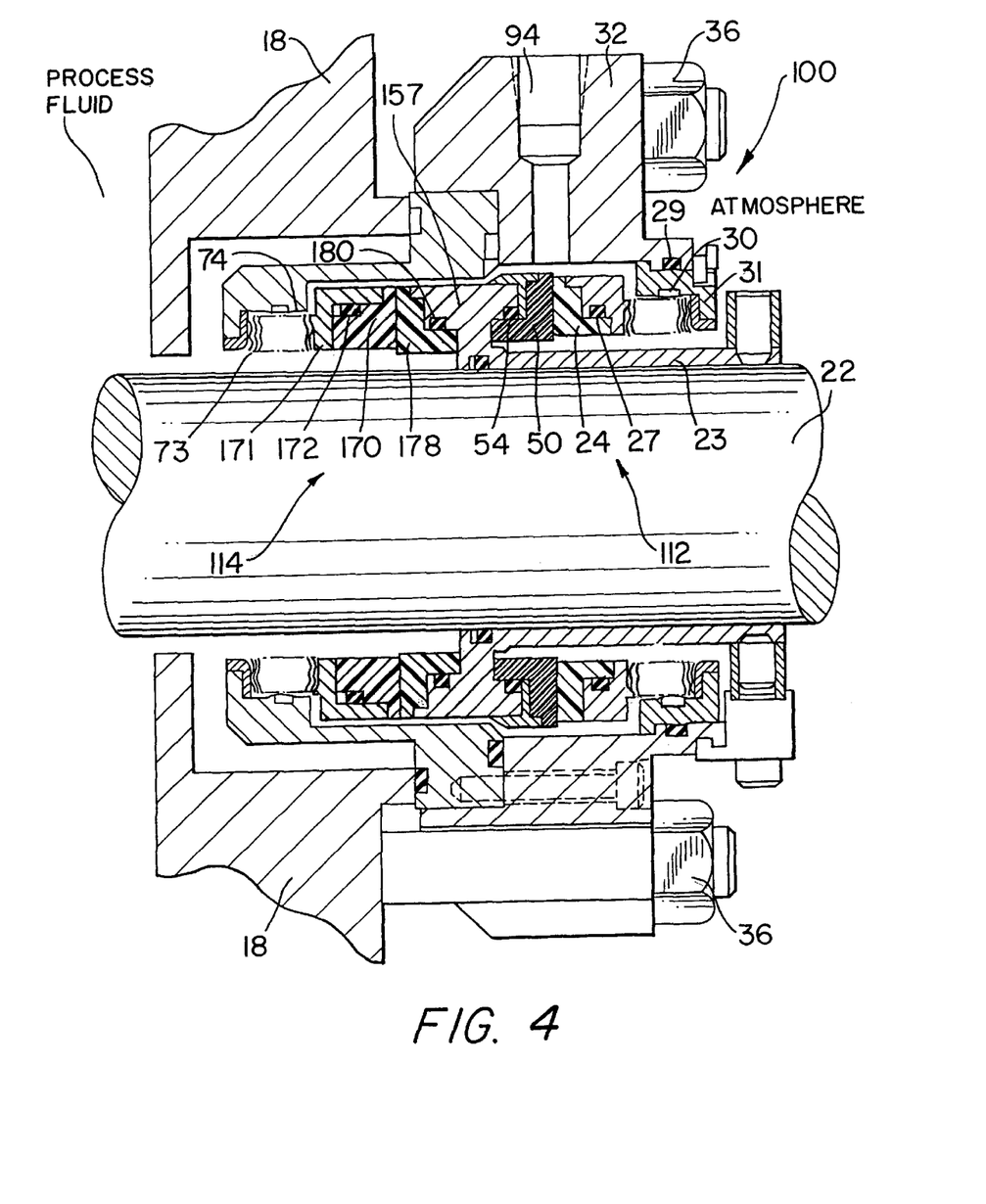
FIG. 4 is a cross-sectional view of a second embodiment of a non-contacting bellows seal according to the present invention.

The second embodiment of a non-contacting bellows gas seal according to the present invention is shown in FIG. 4 and generally denoted by reference numeral 100. The seal 100 includes an outboard non-contacting seal 112 and an inboard non-contacting seal 114. The structure and operation of the outboard seal 112 is the same as the outboard seal 12 of the first embodiment shown in FIG. 1. The same reference numerals are used to refer to the same parts.

The differences in structure and operation between the embodiments of FIGS. 1 and 4 lie in the inboard seals. Inboard seal 114 includes a stationary seal ring 170, a seal ring shell 171, and an O-ring secondary seal 172. As in the FIG. 1 embodiment, bellows 73 attaches to gland 74 which connects to housing 18, and damper strip 76 provides frictional damping of bellows 73.

The rotating assembly of inboard seal 114 includes a rotating seal ring 178 and an O-ring secondary seal 180 between seal ring 178 and a flange portion 157 of sleeve 23. Similar to the seal rings of the FIG. 1 embodiment, rotating seal ring 178 includes spiral grooves on a sealing face opposing the sealing face of stationary seal ring 170.

The diameters of O-rings 172 and 180 differ from those of O-rings 72 and 80 of the FIG. 1 embodiment. The sealing diameter of O-ring 172 is larger than the sealing diameter of O-ring 180 and the main diameter of bellows 173. This affects the operation of inboard seal 114 under reverse pressure conditions, as described further herein.

Figure 5:
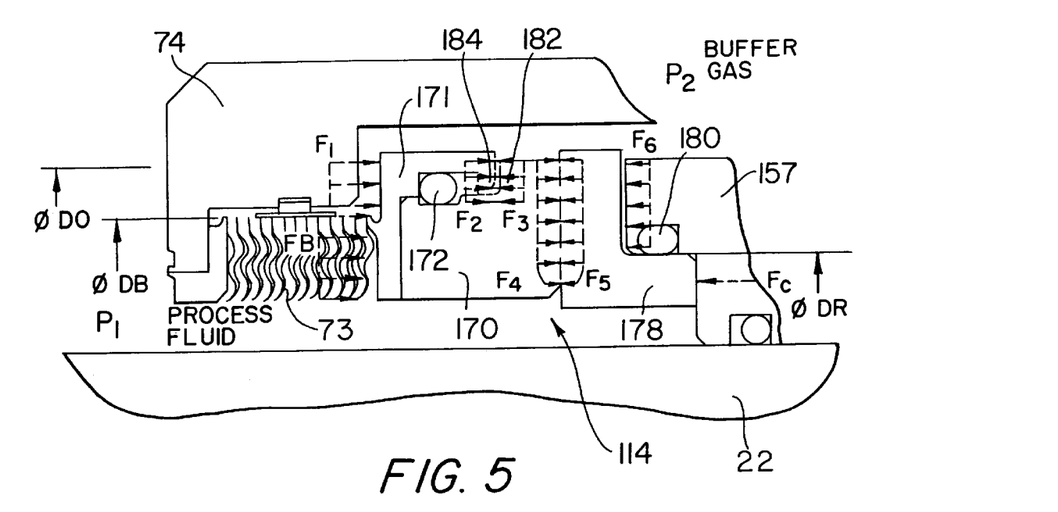
FIG. 5 is a cross-sectional free-body force diagram of the inboard seal of the FIG. 4 seal, showing the forces during normal operation.

FIG. 5 illustrates the forces acting on the inboard seal 114 during normal operating conditions, i.e. the buffer gas pressure $P_2$ exceeds the process fluid pressure $P_1$. These forces are similar to those described earlier in connection with the first embodiment. Bellows 73 supplies a force $FB_o$ acting in the outboard direction that consists of a mechanical spring force component and a hydraulic pressure force component. The latter component varies as a function of pressure differential.

The buffer gas supplies a force $F_1$ acting on the back face of seal ring shell 171 down to the outer diameter DB of bellows 73. $F_1$ acts in the outboard direction. The buffer gas also supplies equal and opposite forces $F_2$ and $F_3$ acting on the opposing faces of seal ring shell 171 and stationary seal ring 170. $F_2$ and $F_3$ act on these faces down to the sealing diameter of O-ring 172 and cancel each other out.

The spiral grooves of rotating seal ring 178 pump buffer gas inward, creating a high opening pressure between the sealing faces of the stationary and rotating seal rings 170 and 178. The forces created by this pressure are represented in FIG. 5 as equal and opposite forces $F_4$ and $F_5$. These forces also cancel each other out.

The buffer gas further provides a force $F_6$ acting on the back face of rotating seal ring 178 down to the sealing diameter DR of O-ring 180. A contact force $F_c$ caused by the contact between rotating seal ring 178 and the flange portion 157 of sleeve 23 also acts on the back face of seal ring 178. $F_6$ and $F_c$ act in an inboard direction.

The net of these forces must equal zero:

$$FB_o + F_1 + F_2 - F_3 + F_4 - F_5 - F_6 - F_c = 0 \quad \text{(eq. 11)}$$

Canceling $F_2$, $F_3$, $F_4$, and $F_5$ results in:

$$F_c = FB_o + F_1 - F_6 \quad \text{(eq. 12)}$$

$$F_c = FB_o + F_1 - F_6. \quad \text{(eq. 12)}$$

As $F_1 = (P_2 - P_1) \times \frac{\pi}{4}(DO^2 - DB^2)$, (eq. 13)

and $$F_6 = (P_2 - P_1) \times \frac{\pi}{4}(DO^2 - DR^2), \quad \text{(eq. 14)}$$

then $$F_c = FB_o + \frac{\pi}{4}(P_2 - P_1)(DR^2 - DB^2). \quad \text{(eq. 15)}$$

Because $FB_o > 0$, $P_2 - P_1 > 0$, and the sealing diameter DR of O-ring 180 is larger than the outer diameter DB of bellows 173, $$F_c > 0.$$

Under normal operating conditions, therefore, the contact force $F_c$ is greater than zero and rotating seal ring 178 will remain in place, seated against flange portion 157 of sleeve 23. Under such conditions and as shown in FIG. 5, a stepped portion 182 of stationary seal ring 170 mates with a corresponding stop portion 184 of seal ring shell 171.

Should the seal 100 experience a pressure reversal so that $P_1$ is greater than $P_2$, high pressure process fluid acting between seal ring shell 171 and stationary seal ring 170 will separate shell 171 from ring 170 and force shell 171 in the inboard direction. Because the sealing diameter of O-ring 172 is larger than the outer diameter of bellows 73, the fluid pressure forces acting on the outboard face of shell 171 to force shell 171 in the inboard direction exceed the fluid pressure forces acting on the inboard face of shell 171 to force shell 171 in the outboard direction. Also, because the sealing diameter of O-ring 172 is larger than the sealing diameter of O-ring 180, the fluid pressure forces acting on the back (inboard) face of stationary seal ring 170 exceed the fluid pressure forces acting on the back (outboard) face of rotating seal ring 178. These fluid pressure forces will be described in more detail below. The net effect is that shell 171 moves axially in the inboard direction and the stationary and rotating sealing rings 170 and 178 will remain in the same axial position as that during normal operation. Seal ring shell 171 will continue axial movement in the inboard direction until shell 171 contacts gland 74. The high fluid pressure forces acting on the back face of stationary seal ring 170 and a contact force at the back face of rotating seal ring 178 from flange 157 will force the seal rings to close, preventing leakage of process fluid into chamber 92.

Figure 6A:
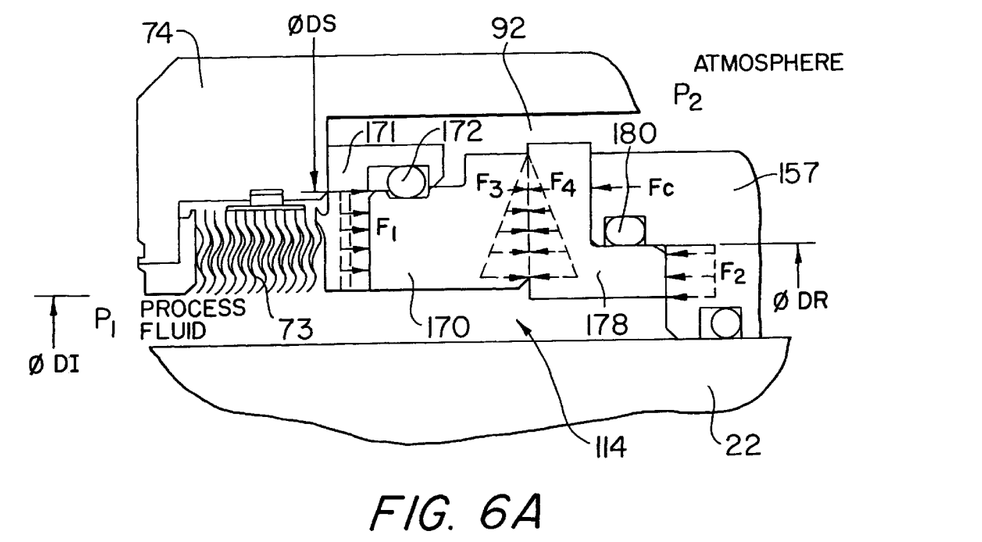
FIGS. 6A and 6B are cross-sectional free-body force diagrams of the inboard seal of the FIG. 4 seal, showing the forces during reverse pressure conditions.
Figure 6B:
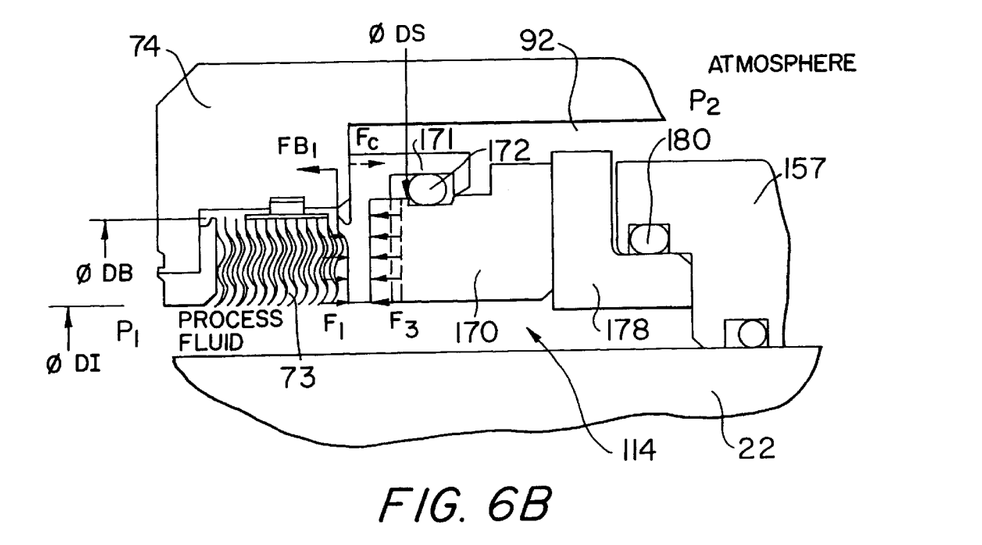

FIGS. 6A and 6B show the forces acting on inboard seal 114 under this reverse pressure situation. FIG. 6A shows the forces on seal rings 170 and 178, and FIG. 6B shows the forces on seal ring shell 171. With reference to FIG. 6A, the process fluid applies a force $F_1$ on the back face of stationary seal ring 170 up to the sealing diameter DS of O-ring 172. This force acts in the outboard direction to close the sealing faces. The process fluid also applies a force $F_2$ on the back face of rotating seal ring 178 up to the sealing diameter DR of O-ring 180. A contact force $F_c$ acts on the back face of rotating seal ring 178. $F_2$ and $F_c$ are in the inboard direction. $F_3$ and $F_4$ are caused by process fluid between the seal faces and oppose each other to cancel out.

The net of these forces must equal zero:

$$F_1 + F_3 - F_2 - F_4 - F_c = 0 \quad \text{(eq. 16)}$$

Canceling $F_3$ and $F_4$ results in:

$$F_c = F_1 - F_2. \quad \text{(eq. 17)}$$

Since $F_1 = (P_1 - P_2) \times \frac{\pi}{4}(DS^2 - DI^2),$ (eq. 18)

and $$F_2 = (P_1 - P_2) \times \frac{\pi}{4}(DR^2 - DI^2), \quad \text{(eq. 19)}$$

then $$F_c = \frac{\pi}{4}(P_1 - P_2)(DS^2 - DR^2). \quad \text{(eq. 20)}$$

Because $P_1 - P_2 > 0$ and the sealing diameter DS of O-ring 172 is greater than the sealing diameter DR of O-ring 180, $F_c$ is greater than zero. Under reverse pressure conditions, therefore, seal ring 178 and flange 157 will remain in contact As shown in FIG. 6B, bellows 73 provides a force $FB_i$ in the inboard direction, compressing bellows 73 under reverse pressure conditions. The process fluid applies a force $F_1$ at the back face of seal ring shell 171 up to the outer diameter DB of bellows 73. The process fluid also applies a force $F_3$ at the opposite outboard face of seal ring shell 171 up to the sealing diameter DS of O-ring 172. Gland 74 supplies a contact force $F_c$ on the back face of seal ring shell 171.

The net of these forces must equal zero:

$$FB_i - F_1 - F_c + F_3 = 0. \quad \text{(eq. 21)}$$

As $F_1 = (P_1 - P_2) \times \frac{\pi}{4}(DB^2 - DI^2),$ (eq. 22)

and $$F_3 = (P_1 - P_2) \times \frac{\pi}{4}(DS^2 - DI^2), \quad \text{(eq. 23)}$$

then $$F_c = FB_i + \frac{\pi}{4}(P_1 - P_2)(DS^2 - DB^2). \quad \text{(eq. 24)}$$

Because $FB_i > 0$, $P_1 > P_2$, and the sealing diameter DS of O-ring 172 is greater than the outer diameter DB of bellows 73, $$F_c > 0.$$

Under reverse pressure conditions, therefore, the contact force $F_c$ between gland 74 and seal ring shell 171 is greater than zero. Shell 171 moves in the inboard direction until it contacts gland 174.

It will be apparent to those skilled in the art that various modifications and variations can be made to the seal of the present invention without departing from the scope or spirit of the invention. Thus, it is intended that the present invention cover the modifications and variations of this invention provided they come within the scope of the appended claims and their equivalents.

What is claimed is:

1. A seal for sealing a low pressure area from a high pressure area for containing a process fluid, the high pressure area located along a rotatable shaft extending from a machine body, the seal comprising:

an outboard seal positioned along the shaft; and an inboard seal axially spaced along the shaft between the outboard seal and the machine body to define an annular chamber between the inboard seal and the outboard seal for containing a buffer fluid, the inboard seal including:

a stationary assembly attached to the machine body, the stationary assembly including a stationary seal ring having a stationary sealing face, and a first secondary seal between the stationary seal ring and the machine body providing secondary sealing at a first effective sealing diameter, and a rotating assembly attached to the shaft, the rotating assembly including a rotating seal ring having a rotating sealing face in sealing relation with the stationary sealing face and a second secondary seal between the rotating seal ring and the shaft, wherein the first and second secondary seals each engage an axially extending surface of said stationary and rotating seal rings respectively, and said first and second secondary seals define fluid pressure barriers between the buffer fluid and the process fluid at different effective diameters, resulting in at least a portion of the stationary and rotating assemblies including at least both said stationary seal ring and said rotating seal ring being axially shifted by the pressure of the process fluid when the pressure of the buffer fluid becomes less than the pressure of the process fluid.

2. A seal for sealing a low pressure area from a high pressure area for containing a process fluid, the high pressure area located along a rotatable shaft extending from a machine body, the seal comprising:

an outboard seal positioned along the shaft; and an inboard seal axially spaced along the shaft from the outboard seal to define an annular chamber between the inboard seal and the outboard seal for containing a buffer fluid, the inboard seal including a stationary assembly attached to the machine body, the stationary assembly including a stationary seal ring having a stationary sealing face, and a first secondary seal between the stationary seal ring and the housing, and a rotating assembly attached to the shaft, the rotating assembly including a rotating seal ring having a rotating sealing face in sealing relation with the stationary sealing face and a second secondary seal between the rotating seal ring and the shaft, wherein the first and second secondary seals define fluid pressure barriers for causing axial movement of at least a portion of the stationary assembly and maintaining the sealing relation of the rotating and stationary sealing faces when the pressure of the buffer fluid is less than the pressure of the process fluid, and wherein the first secondary seal includes a bellows and the second secondary seal includes an O-ring, and a sealing diameter of the O-ring is larger than an effective sealing diameter of the bellows so that fluid pressure forces cause the stationary and rotating seal rings to move axially when the pressure of the buffer fluid is less than the pressure of the process fluid.

3. The seal according to claim 1, further comprising a seal ring shell mating with the stationary seal ring between the stationary seal ring and the housing, wherein the first secondary seal includes a first O-ring between the stationary seal ring and the seal ring shell and the second secondary seal includes a second O-ring, a sealing diameter of the first O-ring being larger than a sealing diameter of the second O-ring so that fluid pressure forces cause the seal ring shell to move axially when the pressure of the buffer fluid is less than the pressure of the process fluid.

4. The seal according to claim 3, wherein the first secondary seal includes a welded metal bellows engaging said seal ring shell at one end of said bellows, and the sealing diameter of the first O-ring is larger than an effective sealing diameter of the metal bellows.

5. The seal according to claim 1, wherein the first secondary seal includes a metal bellows, such that when the pressure of the buffer fluid becomes less than the pressure of the process fluid, the pressure of said process fluid causes an axial shift in the seal ring associated with the stationary assembly to thereby compress the bellows.

6. A gas seal comprising:
a stationary assembly attached to a machine body, the stationary assembly including a stationary seal ring having a stationary sealing face, and a first secondary seal having a first effective sealing diameter between the machine body and the stationary seal ring; and
a rotary assembly attached to a rotatable shaft extending from the machine body, the rotary assembly including a rotating seal ring having a rotating sealing face in sealing relation with the stationary sealing face, and a second secondary seal between the rotating seal ring and the rotatable shaft, said second secondary seal having a sealing diameter, wherein said effective sealing diameter of the first secondary seal differs from said sealing diameter of the second secondary seal to define fluid pressure barriers between a process fluid to be sealed and a buffer fluid supplied to the gas seal, so that fluid pressure forces cause axial movement of at least a portion of the stationary assembly, including axial displacement of both the stationary and rotating seal rings as the direction of a pressure differential of the process fluid and the buffer fluid changes.

7. A gas seal comprising:
a stationary assembly attached to a machine body, the stationary assembly including a stationary seal ring having a stationary sealing face, and a first secondary seal between the machine body and the stationary seal ring; and
a rotary assembly attached to a rotatable shaft extending from the machine body, the rotary assembly including a rotating seal ring having a rotating sealing face in sealing relation with the stationary sealing face, and a second secondary seal between the rotating seal ring and the rotatable shaft, wherein a sealing diameter of the first secondary seal differs from a sealing diameter of the second secondary seal to define fluid pressure barriers so that fluid pressure forces cause axial movement of at least a portion of the stationary assembly depending on a pressure differential of a process fluid to be sealed and a buffer fluid supplied to the gas seal, wherein the first secondary seal includes a bellows and the second secondary seal includes an O-ring, a sealing diameter of the O-ring being larger than an effective sealing diameter of the bellows so that fluid pressure forces cause the stationary and rotating seal rings to move axially when the pressure of the buffer fluid is less than the pressure of the process fluid.

8. The seal according to claim 6, further comprising a seal ring shell mating with the stationary seal ring between the stationary seal ring and the housing, wherein the first secondary seal includes a first O-ring between the stationary seal ring and the seal ring shell and the second secondary seal includes a second O-ring, a sealing diameter of the first O-ring being larger than a sealing diameter of the second O-ring so that fluid pressure forces cause the seal ring shell to move axially when the pressure of the buffer fluid is less than the pressure of the process fluid.

9. The seal according to claim 8, wherein the first secondary seal includes a bellows, the sealing diameter of the first O-ring being larger than an effective sealing diameter of the bellows.

10. The gas seal according to claim 6, wherein said machine body includes a bellows which provides a contact biasing force to the stationary assembly to maintain the stationary sealing face and rotating sealing face in sealing relation when the pressure of the process fluid exceeds the pressure of the buffer fluid.

11. A seal for sealing a low pressure area from a high pressure area for containing a process fluid, the high pressure area located along a rotatable shaft extending from a machine body, the seal comprising:
an outboard seal positioned along the shaft; and
an inboard seal axially spaced along the shaft between the outboard seal and the machine body to define an annular chamber between the inboard seal and the outboard seal for containing a buffer fluid, the inboard seal including
a stationary seal ring coupled to the machine body, the stationary seal ring having a stationary sealing face,
a rotating seal ring coupled to the shaft, the rotating seal ring having a rotating sealing face in sealing relation with the stationary sealing face, and
means for defining fluid pressure barriers between the process fluid and the buffer fluid so that fluid pressure forces cause axial movement of a portion of the seal and the stationary and rotating sealing faces remain in sealing relation when the pressure of the process fluid is greater than the pressure of the buffer fluid, wherein said defining means engages axially extending surfaces of said stationary and rotating seal rings.

12. The seal according to claim 11, wherein the defining means includes a first secondary seal between the stationary seal ring and the machine body and a second secondary seal between the rotating seal ring and the shaft, a sealing diameter of the first secondary seal differing from a sealing diameter of the second secondary seal to define the fluid pressure barriers.

13. The seal according to claim 12, wherein the first secondary seal includes a first O-ring and the second secondary seal includes a second O-ring, the sealing diameter of the first O-ring being larger than the sealing diameter of the second O-ring.

14. The seal according to claim 13, further comprising a seal ring shell mating with the stationary seal ring between the stationary seal ring and the machine body, the seal ring shell being axially movable when the pressure of the process fluid is greater than the pressure of the buffer fluid.

15. The seal according to claim 13, wherein the fluid pressure barriers are defined so that the fluid pressure forces on a back face of the stationary seal ring opposite the stationary sealing face are greater than the fluid pressure forces on a back face of the rotating seal ring opposite the rotating sealing face when the pressure of the process fluid is greater than the pressure of the buffer fluid.

16. The seal according to claim 12, wherein the first secondary seal includes a bellows and a first O-ring and the second secondary seal includes a second O-ring, the sealing diameter of the second O-ring being larger than the sealing diameter of the bellows.

17. A seal for sealing a process fluid comprising:
- a stationary seal ring coupled to a machine body, the stationary seal ring having a stationary sealing face;
- a rotating seal ring coupled to a rotatable shaft extending from the machine body, the rotating seal ring having a rotating sealing face in sealing relation with the stationary sealing face; and
- means for defining fluid pressure barriers so that fluid pressure forces cause axial movement of a portion of the seal and the stationary and rotating sealing faces remain in sealing relation when the pressure of the process fluid is greater than the pressure of a buffer fluid supplied to the seal, wherein the means for defining includes a first secondary seal between the stationary seal ring and the machine body and a second secondary seal between the rotating seal ring and the shaft, a sealing diameter of the first secondary seal differing from a sealing diameter of the second secondary seal to define the fluid pressure barriers, wherein the first secondary seal includes a bellows and the second secondary seal includes an O-ring, the sealing diameter of the O-ring being larger than the sealing diameter of the bellows, and wherein the stationary seal ring and the rotating seal ring are axially movable when the pressure of the process fluid is greater than the pressure of the buffer fluid.

18. The seal according to claim 16, further comprising a seal ring shell between the bellows and the stationary seal ring, wherein the fluid pressure barriers are defined so that the fluid pressure forces on a back face of the rotating seal ring opposite the rotating sealing face are greater than the fluid pressure forces on a face of the seal ring shell proximate the bellows when the pressure of the process fluid is greater than the pressure of the buffer fluid.

* * * * *